United States Patent [19]

Okabe et al.

[11] 4,375,646
[45] Mar. 1, 1983

[54] COLOR TELEVISION RECEIVER WITH MEANS FOR DISABLING VIR CORRECTION DURING REPRODUCTION OF RECORDED BROADCAST SIGNALS

[75] Inventors: Yukio Okabe; Yasuaki Watanabe, both of Yokohama, Japan

[73] Assignee: Victor Company of Japan, Limited, Yokohama, Japan

[21] Appl. No.: 151,536

[22] Filed: May 19, 1980

[30] Foreign Application Priority Data

May 22, 1979 [JP] Japan .................... 54-62237

[51] Int. Cl.³ ............................ H04N 9/535
[52] U.S. Cl. ...................... 358/21 V; 358/27; 358/28; 358/310
[58] Field of Search .............. 358/21 V, 4, 27, 28

[56] References Cited

U.S. PATENT DOCUMENTS 4,223,338 9/1980 Tamaru et al. ............... 358/21 V

Primary Examiner—Richard Murray
Attorney, Agent, or Firm—Lowe, King, Price & Becker

[57] ABSTRACT

In a color television receiver adapted to receive a color television signal containing vertical interval reference (VIR) signals, a VIR correction circuit is provided to automatically control the hue and color saturation of the received broadcast signal, which may also be coupled to a video tape recorder of the type in which adjacent field signals are recorded with their respective record tracks being skewed relative to each other to permit elimination of otherwise required guardbands between adjacent field tracks. The recorded video signal is reproduced by mixing adjacent horizontal line signals to reduce crosstalk level. A disabling circuit is provided to disable the VIR correction circuit when the receiver is switched to the output of the video tape recorder in playback mode to prevent false VIR signals due to the mixing from affecting the reproduced colors.

4 Claims, 2 Drawing Figures

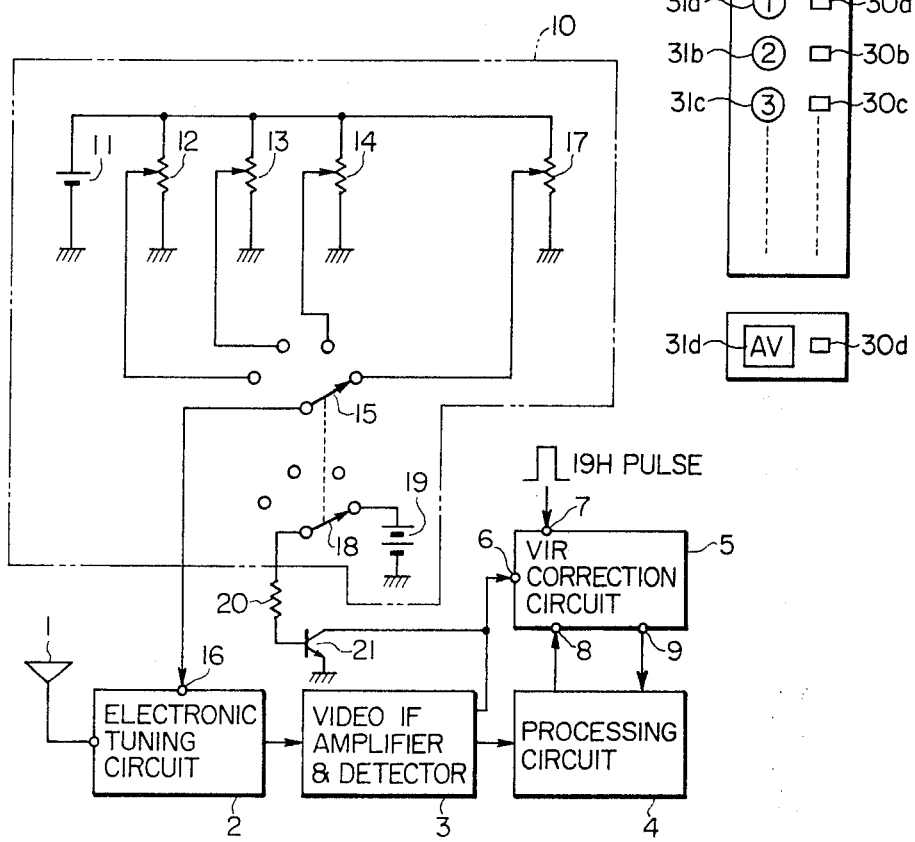

COLOR TELEVISION RECEIVER WITH MEANS FOR DISABLING VIR CORRECTION DURING REPRODUCTION OF RECORDED BROADCAST SIGNALS

BACKGROUND OF THE INVENTION

The present invention relates to color television receivers, and more particularly to a color television receiver adapted to receive a television signal which contains a vertical interval reference (VIR) signal for automatic correction of hue and color saturation wherein the VIR signal is disabled when the receiver is tuned to such a program source as disclosed in U.S. Pat. No. 4,178,606 granted to A. Hirota, which reproduces a recorded video signal by mixing adjacent horizontal line signals for eliminating crosstalk occurring in low-frequency color carrier signals.

Since a transmitted color television signal undergoes a phase distortion due to the inherent differential phase characteristic of the transmission path, the reproduced image tends to change in hue and color saturation from the original. The VIR signal is inserted prior to transmission into the 19th horizontal synchronization pulse position during each vertical blanking interval of the NTSC color television signal as specified by the Federal Communications Commission so as to permit receivers to automatically correct errors in hue and color saturation. The color television receiver currently includes a counter for counting the horizontal synchronization pulses during each vertical blanking interval to generate a gating pulse at the 19th count to gate on the received signal to extract the VIR signal contained therein. Therefore, there is no likelihood of the receiver erroneously discriminating it from any other signals which may be present in adjacent horizontal pulse positions.

In the current one-half inch video cassette tape recorder the azimuth angles of the recording heads are so skewed relative to each other that the horizontal line signals of each successive field signal are recorded in a direction angularly displaced from the direction in which the horizontal line signals of the adjacent field is recorded. This permits elimination of guardbands which are usually required in other video tape recorders to ensure against crosstalk between adjacent field signals. However, in the stage of reproduction this angular displacement has lesser effect of crosstalk suppression on lower frequency color carrier signals than on higher frequency signals. The current practice is to employ a one horizontal line delay circuit and a mixing circuit for mixing the input and output signals of the delay circuit for suppressing the crosstalk and so the result is an output which is an average value of the combined adjacent horizontal line signals. If the VIR inserted NTSC signal is recorded and reproduced later for application to the conventional NTSC color television receiver having the VIR correction feature, the gated VIR signal is considerably reduced in level due to the averaging effect causing an error in color saturation. The problem would become severe if other signals such as vertical interval test (VIT) signal are present in the 18th and 20th horizontal pulse positions since the averaging effect of the mixing circuit produces an output which is remarkably different from the original VIR signal, thus resulting in a totally different hue and color saturation from the original.

SUMMARY OF THE INVENTION

Accordingly, an object of the present invention is to provide a color television receiver which provides compatibility to the reproduction of directly received broadcast VIR-inserted color television signals and to the reproduction of pre-recorded broadcast VIR-inserted color television signals which are played back through mixing of adjacent horizontal line signals.

This object is obtained by a disabling circuit which disables the VIR correction circuit of the receiver in response to the latter being coupled to a video tape recorder which supplies thereto the mixed horizontal line signals. During this disablement, the false VIR signal is prevented from affecting the hue and color saturation of the received video signal allowing the viewer to manually adjust the hue and color saturation of the reproduced image.

BRIEF DESCRIPTION OF THE DRAWINGS

The invention will be further described with reference to the accompanying drawings, in which:

FIG. 1 is an illustration of an embodiment of the present invention; and

FIG. 2 is an illustration of a channel selection key arrangement associated with the tuning circuit of the embodiment of FIG. 1.

DETAILED DESCRIPTION

The circuit shown in FIG. 1 is a part of a color television receiver incorporating the present invention. The receiver includes an electronic tuning circuit 2 which receives transmitted broadcast signal from antenna 1 and provides selection of a program in response to a signal applied to terminal 16 from a tuning voltage circuit 10 shown in broken lines. The circuit 10 includes a plurality of potentiometers 12, 13, 14 and 17 which are connected from a voltage supply 11 to respective terminals of a multi-position switch 15 which selectively connects one of the respectively adjusted d.c. potentials to the input terminal 16 of the tuning circuit 2. The selection of the terminal positions of switch 15 is effected in a conventional manner by means of a plurality of push buttons 30a, 30b, 30c, and 30d arranged on the front panel of the receiver as illustrated in FIG. 2 with the corresponding channel number indicators 31a, 31b, 31c and 31d. The push buttons 30a to 30c are associated with the broadcast programs, while the push button 30d is associated with a program source other than the broadcast sources, such as video tape recorders. Upon user's depression of a button associated with a broadcast program, the switch 15 is automatically positioned to the terminal connected with the potentiometer 12, 13 or 14, while the depression of the button 30d causes the switch 15 to connect the potentiometer 17 to the tuning circuit 2 to receive the non-broadcast program.

The tuned broadcast television signal, which contains the VIR signal, is supplied to a video IF amplifier and detector circuit 3 and thence to a processing circuit 4 and also to a VIR correction circuit 5 via terminal 6. The VIR correction circuit 5 receives a gate pulse supplied from a well known circuit, not shown, at the 19th count of horizontal synchronization pulses during the period of each vertical blanking interval. In response to the gate pulse, the VIR correction circuit 5 extracts a VIR signal from the input signal supplied thereto from the video IF amplifier and detector circuit 3 for making a comparison with a signal supplied via terminal 8 from the processing circuit 4 to derive a correction signal which indicates any deviation of the hue and color saturation of the demodulated color signal from the reference level. This correction signal is then coupled via terminal 9 to the processing circuit 4 as a feedback signal to reduce the deviation substantially to zero in the conventional manner for proper rendition of colors on the cathode ray tube screen.

When a viewer depresses the button 30d to permit the system to receive a recorded video signal from a video tape recorder, not shown, the switch 15 is positioned to connect the potentiometer 17 to the tuning circuit 2 to receive the recorded video signal through a predetermined vacant channel. At the same time, a switch 18 is positioned to connect a d.c. potential from a battery 19 to the base of a transistor 21 through a resistor 20 to turn it on. This provides a short circuit path from ground to terminal 6 of the VIR correction circuit 5 so that the latter is disabled.

If the recorded video signal contains VIR signals which are reproduced by averaging the adjacent horizontal line signals one of which has been delayed for a horizontal scan period, the disablement of the VIR correction circuit 5 effectively avoids rendition of colors which might deviate in hue and color saturation from the respective reference values as a result of the averaging effect of the adjacent horizontal line signals.

Disablement of the VIR correction circuit 5 could equally be performed as well by other alternative methods which include providing an open circuit at the output terminal 9, or disabling the gate pulse appearing at the terminal 7, or cutting off the power supply to the circuit 5.

What is claimed is:

1. A color television receiver adapted to receive a color television signal which contains a vertical interval reference (VIR) signal in the vertical blanking interval of the received signal, said receiver having means for detecting the color television signal to produce a video signal, a VIR correction circuit receiving the video signal at an input terminal thereof for deriving a correction signal indicative of the deviation in hue and color saturation of the received signal from respective reference values, means for reducing said deviation substantially to zero in response to said correction signal, and means for selectively causing the receiver to be tuned to one of a plurality of broadcast television signals each containing said VIR signal and to be tuned to a program source which reproduces a recorded video signal by mixing video signals of adjacent horizontal lines, said receiver comprising means for inhibiting the detected video signal from being supplied to an input terminal of said VIR correction circuit when said receiver is tuned to said program source.

2. A color television receiver as claimed in claim 1, wherein said program source comprises a video tape recorder.

3. A color television receiver as claimed in claim 1 or 2, wherein said disabling means comprises means for inhibiting an input signal applied to said VIR correction circuit.

4. A color television receiver as claimed in claim 1, wherein said inhibiting means comprises a transistor responsive to said receiver being tuned to said video program source to establish a short-circuit path between said input terminal and ground.

* * * * *